(12) United States Patent
Kennedy et al.

(10) Patent No.: US 6,577,469 B2
(45) Date of Patent: *Jun. 10, 2003

(54) VARIABLE WIDTH FLAT TAPE HEAD FOR BI-DIRECTIONAL CONTACT RECORDING AND METHOD FOR MAKING THE SAME

(75) Inventors: James Kennedy, Palmer, MA (US); Donna Jean Kaiser, North Reading, MA (US)

(73) Assignee: Quantum Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/128,100

(22) Filed: Apr. 23, 2002

(65) Prior Publication Data

US 2002/0167758 A1 Nov. 14, 2002

Related U.S. Application Data

(63) Continuation-in-part of application No. 09/594,217, filed on Jun. 14, 2000, now Pat. No. 6,424,496.

(51) Int. Cl.$^7$ .............................................. G11B 5/265
(52) U.S. Cl. ...................................... 360/121; 360/316
(58) Field of Search ........................... 360/121, 130.21, 360/241.1, 241.2, 241.3, 316

(56) References Cited

U.S. PATENT DOCUMENTS

| | | | |
|---|---|---|---|
| 3,737,582 A | 6/1973 | DeMoss | 179/100.2 |
| 5,034,838 A | 7/1991 | Brock et al. | 360/122 |
| 5,475,553 A | 12/1995 | Saliba | 360/122 |
| 5,870,924 A | 2/1999 | Fahimi et al. | 72/379.2 |
| 5,883,770 A | 3/1999 | Biskeborn et al. | 360/130.21 |
| 5,905,613 A | 5/1999 | Biskeborn et al. | 360/130.21 |
| 5,949,625 A | 9/1999 | Sato et al. | 360/122 |
| 5,953,184 A | 9/1999 | Barber et al. | 360/121 |
| 5,963,401 A | 10/1999 | Dee et al. | 360/113 |
| 5,969,912 A | 10/1999 | Cope | 360/122 |
| 6,118,626 A | 9/2000 | Müftü | 360/122 |
| 6,341,416 B1 | 1/2002 | Biskeborn et al. | |

OTHER PUBLICATIONS

Hinteregger, Hans F., and Müftü, Sinan, Flat Heads for Contact Tape Recording: Measurements of Performance Insensitivity to Speed, Tension, Stiffness and Wrap Variations, Jun. 28–30, 1999, pp.1–15.

Hinteregger, Hans F., and Müftü, Sinan, Contact Tape Recording with a Flat Head Contour, IEEE Transactions on Magnetics, vol. 32, No. 5, Sep. 1996, pp. 3476–3478.

Hinteregger, Hans F., and Müftü, Sinan, The Self-Acting, Subambient Foil Bearing in High Speed, Contact Tape Recording with a Flat Head©, Tribology Transactions, vol. 41(1998), 1, pp. 19–26.

*Primary Examiner*—A. J. Heinz
(74) *Attorney, Agent, or Firm*—Morrison & Foerster LLP

(57) ABSTRACT

A variable width flat tape head for bi-directional contact recording and method for making the same has significant advantages over both traditional contoured tape heads and single width flat heads for contact recording applications. The variable width head and process disclosed herein allows for greater ease of manufacturing, efficient layout of the devices on thin film wafers and provides a significant cost reduction in the production of the head compared to traditionally contoured tape heads. In addition, the present invention reduces unnecessary surface area where the tape contacts the head, thus reducing tape wear and damage that is present in single width flat heads (where the tape is in contact uniformly across the tape width), thereby providing a concomitant improvement in tape wear and life. In addition, the head of the present invention is simpler and less costly to manufacture than comparable devices with distinct advantages to the magnetoresistive ("MR") read element stripe height control process, device alignment and assembly processes, particularly with respect to traditionally contoured tape heads, which require more complex and expensive manufacturing operations to form the tape head profile.

11 Claims, 9 Drawing Sheets

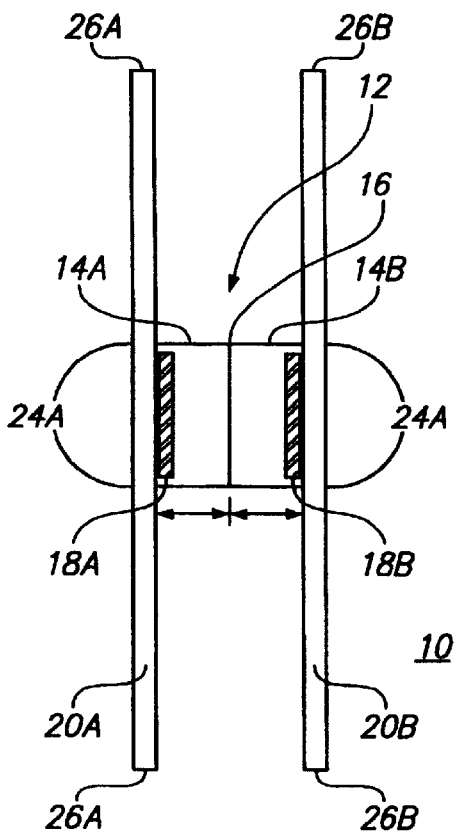
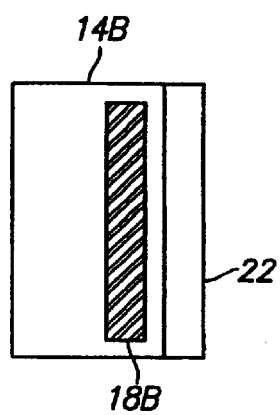
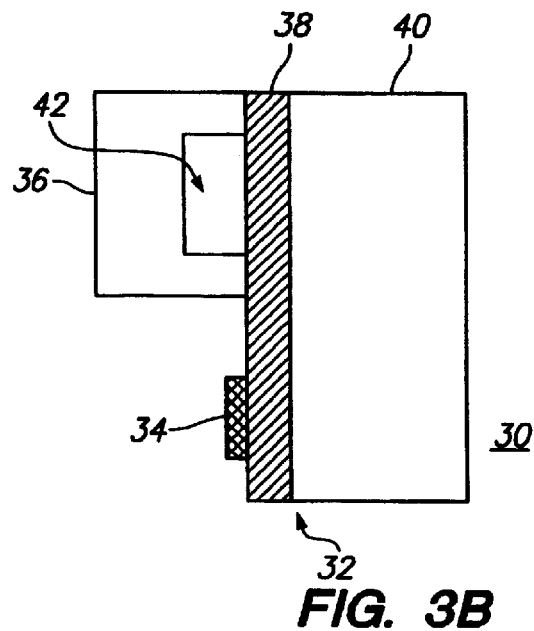
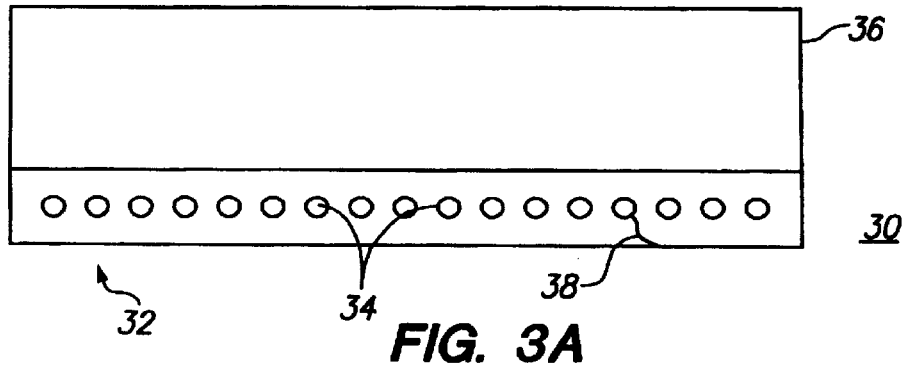
FIG. 1
FIG. 2
FIG. 3B
FIG. 3A

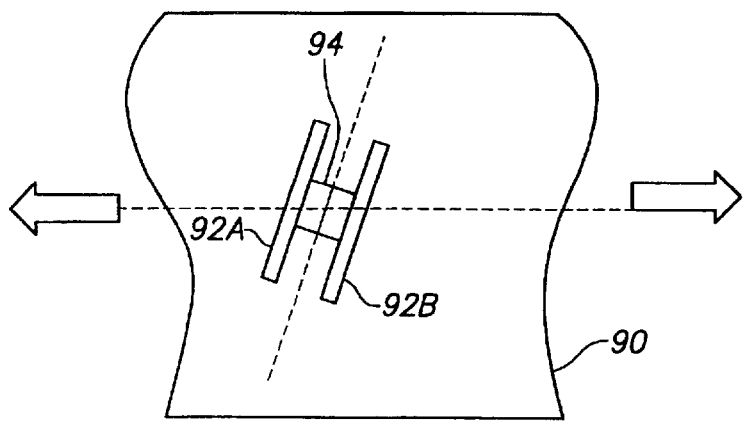

FIG. 11

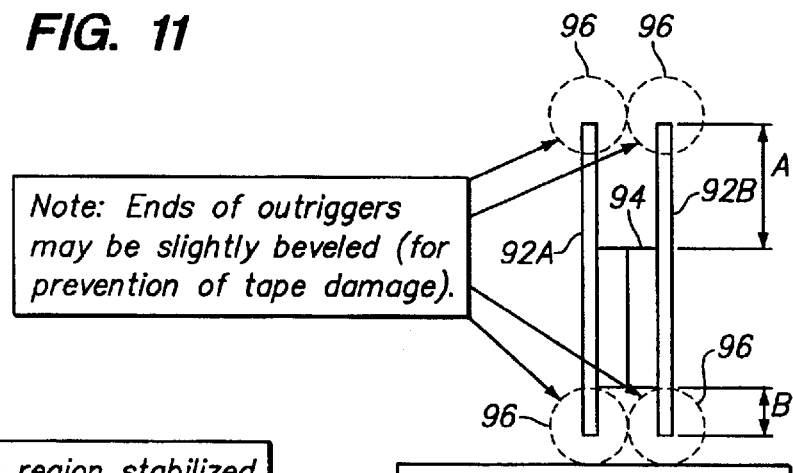

Note: Ends of outriggers may be slightly beveled (for prevention of tape damage).

Example of Asymmetric placement of outriggers.

FIG. 12

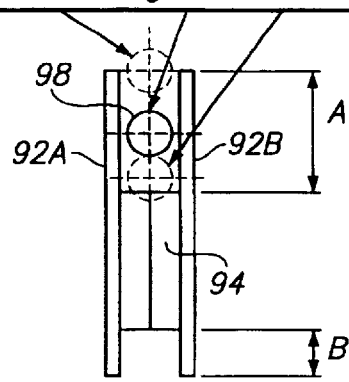

Unsupported tape region stabilized by skis for positioning of optics, laser, etc.; can be positioned anywhere in region A Example of using asymmetric placement of skis for mounting laser, optics, or other sensor requiring a relatively stable tape region.

FIG. 13

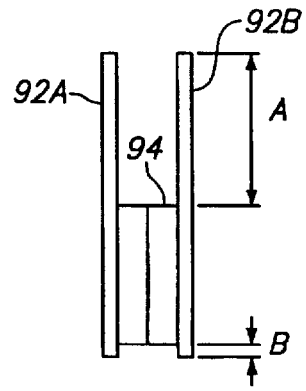

FIG. 14

A. Short Skis (A<B)

B. Long Skis (A>B)

Schematic of "Mini-outrigger" which accurately controls wrap angle to the flat head

VARIABLE WIDTH FLAT TAPE HEAD FOR BI-DIRECTIONAL CONTACT RECORDING AND METHOD FOR MAKING THE SAME

RELATED APPLICATION

The present application is a continuation-in-part of U.S. patent application Ser. No. 09/594,217 U.S. Pat. No. 6,424,496 filed Jun. 14, 2000, assigned to Quantum Corporation, assignee of the present invention, the disclosure of which is herein specifically incorporated by this reference.

BACKGROUND OF THE INVENTION

The present invention relates, in general, to the field of data transducers for magnetic recording. More particularly, the present invention relates to a variable width flat tape head for bi-directional contact recording and method for making the same.

The effectiveness of contact recording in magnetic tape drives depends, to a large extent, on the spacing between the head and the tape medium and, as a consequence, conventional contact recording tape heads often contain a complex contoured surface with which to contact the tape. This contoured surface is comparatively expensive to manufacture and therefore adds significantly to the overall cost of the head. With contoured tape heads, however, as the tape speed increases, air can be entrained at the edges with resultant signal loss. In an effort to ameliorate this condition, bleed slots (whether transverse or longitudinal) may be cut into the head to reduce the effect of this boundary layer of air. However, this only further adds to the cost of head production by adding additional manufacturing steps.

An alternative head design is what is known generally as a "flat head". These designs are relatively well understood, and it is known that they can provide significant advantages over traditionally designed contoured tape heads. Moreover, a flat head design is simpler to produce and significantly reduces manufacturing costs by eliminating the contouring processes. However, all flat head designs described to date have been of a single width.

The physics surrounding such single width flat head designs have been described, inter alia, by Dr. Sinan Muftu in a number of monographs on the subject. See for example: *The Self Acting, Subambient Foil Bearing in High Speed, Contact Tape Recording with a Flat Head,* Muftu, S. and Hinteregger, H., Tribology Transactions (Feb. 11, 1997); *Contact Tape Recording with a Flat Head Contour,* Hinteregger, H., and Muftu, S., IEEE Transactions on Magnetics, Vol. 32. No. 5, September 1996; *Flat Heads For Contact Tape Recording: Measurements of Performance Insensitivity to Speed, Tension, Stiffness, and wrap Variations,* Hinteregger, H., and Muftu, S., Proceedings of the 10th Symposium on Information Storage and Processing Systems, Santa Clara, Calif. Jun. 28–30, 1999.

Regardless of the design chosen, wear of both the tape and the head will obviously occur at the tape-to-head interface and this wear is directly proportional to the area in actual physical contact. Further, with the use of thin-film wafer materials for the production of more advanced tape heads, the wafer substrate is often a wear resistant material (e.g. ceramic or aluminum-titanium carbide "Al—TiC") and wear and damage of the tape can be a significant issue.

SUMMARY OF THE INVENTION

The variable width flat tape head for bi-directional contact recording and method of making the same disclosed herein overcomes many of the limitations of conventional single width flat head designs by incorporating the advantages of variable width to aid in providing overall performance enhancements and cost effective manufacturability. In this regard, the variable width bi-directional flat head of the present invention affords all of the distinct advantages of a conventional single width flat head, while providing important advantages over those older designs in the minimization of tape wear together with significant decreases in manufacturing costs associated with the creation of a bi-directional tape head.

As disclosed herein, the variable width flat tape head design of the present invention reduces manufacturing costs by eliminating the requirement to utilize additional wafer space for physically supporting the tape. In addition, this design eliminates the need for the bonding of 'wear pads' adjacent to the device active region to physically support the tape across its entire width to provide uniform contact with the tape during operation. The variable width flat head design of the present invention effectively reduces the area of contact between the head and the tape, thereby reducing wear and potential damage to the tape during operation. Specifically, the design disclosed herein exhibits many significant advantages over both traditionally contoured tape heads and single width flat heads and the flat head effect is used in this design only over the active elements of the head, thus reducing potential tape damage.

Among the advantages of the variable width bi-directional flat tape head design of the present invention are robust performance over a wide range of tape speeds. In this regard, the design affords an actual decrease in tape-to-head spacing at increasing tape speeds (from ~50 inches per second ("ips") to 500 ips or more) in contrast to traditionally contoured tape heads where the tape head spacing actually increases with increasing tape speeds. Moreover, the head design of the present invention is scalable with the increasing tape speeds required to provide for faster data transfer rates.

The design disclosed herein further provides for more robust performance at relatively low tape tensions with acceptable tape-to-head spacing required for contact recording being achieved at only about 1.0–3.0 oz. These lower tape tensions lead to less tape wear, less pole tip recession ("PTR") or differential wear over the device region and substrate and, ultimately to less power being required in the tape transport motors.

The outriggers forming a part of the specific embodiment of the invention illustrated herein, serve to accurately control the wrap angle of the tape about the head in order to essentially achieve a "flat head effect" at relatively low wrap angles of 0.1 to ~5.0 degrees. Beneficially, these low wrap angles further provide less wear to the tape medium and the ability to provide a more simplified tape path when used in a tape drive application. Further, the physics of the variable width flat head provided herein scale with the tape width and a single head design can be used in conjunction with outriggers of varying length in conjunction with a variety of media widths to achieve many possible different form factors while still providing acceptable tape-to-head spacing and potential backwards compatibility.

Further, the variable width bi-directional flat head design of the present invention is robust with respect to head length changes and can accommodate many active elements within a given length while still providing excellent tape-to-head spacing. The head profile provided will also operate effectively in conjunction with a wide variety of tape types (critical parameters include: tape thickness, Young's modulus, tape tension and the like) as opposed to conventional contoured heads which must be individually designed for a given tape medium having particularly defined characteristics in order to minimize entrained air which could lead to signal loss or excessive tape damage. Consequently, it can be used in conjunction with a number of differing media and a single head design (as opposed to many differing designs) is all that is needed in order to accommodate them.

Other known advantages of the present design include the fact that there is less head area in actual contact with the tape, leading to a reduction in potential wear and damage of the tape and head as compared to single-width flat heads and contoured heads. This, naturally, leads to longer tape life. Moreover, the "flat head effect" serves to stabilize the tape over the region of, and between, the active clusters. This allows for fewer tape disturbances such as flutter and lateral tape motion ("LTM") of particular benefit in optical servo applications. In this regard, the design provides an appropriate geometry for the inclusion of an optical sensor to sense optical servo marks on the magnetic side of tape. It further provides for a region within the head structure for the potential inclusion of a lens for detecting optical servo marks on the data tape including those lying in the center of two active clusters at the plane of symmetry.

There are also many manufacturing advantages inherent in the design disclosed herein for a variable width bi-directional flat head which include significant cost reductions due to its simplicity of fabrication and the elimination of many traditionally used processing operations. The magnetoresistive ("MR") read element stripe height may be controlled with a single operation (flat lapping) rather than the multiple steps required in the manufacture of conventional contoured tape heads which require multiple and expensive contour lapping operations with relatively poor yields due to the fact that stripe height and contour shape are interdependent variables. Further, in a particular embodiment, the design of the present invention facilitates the alignment of the head active elements in the two device clusters using a simple fixture rather than expensive optical alignment stations which are currently used in the production of conventional contoured heads. Moreover, the outriggers utilized in the present invention may be easily assembled to precisely control wrap angles necessary to induce the "flat head effect" over bi-directional cluster region. Through an efficient use of head wafer real-estate, no wafer space is "sacrificed" to provide mechanical support to the full width of the tape, as is required in traditional single width flat heads.

Overall, the simplicity of manufacture of the design of the present invention leads to: a reduction in the need for expensive manufacturing or processing capital equipment expenditures; a reduction in processing consumables (e.g. no need for the conventional diamond tape used for contour lapping); a reduction in manufacturing labor; a reduction in total processing time with a concomitant reduction in "Work-In-Process" ("WIP") with an increase in head yield due to the simplicity and elimination of operations, especially stripe height control.

Particularly disclosed herein is a variable width flat tape head for bi-directional contact recording. The method for making the same has significant advantages over both traditional contoured tape heads and single width flat heads for contact recording applications. The variable width head and process disclosed herein allows for greater ease of manufacturing, efficient layout of the devices on thin film wafers and provides a significant cost reduction in the production of the head compared to traditionally contoured tape heads. In addition, the present invention reduces unnecessary surface area where the tape contacts the head, thus reducing tape wear and damage that is present in single width flat heads, (where the tape is in contact uniformly across the tape width), thereby providing a concomitant improvement in tape wear and life. In addition, the head of the present invention is simpler and less costly to manufacture than comparable devices with distinct advantages to the MR read element stripe height control process, device alignment and assembly processes, particularly with respect to traditionally contoured tape heads which require more complex and expensive manufacturing operations to form the tape head profile.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIG. 1 is a top plan view of an embodiment of the variable width bi-directional flat head of the present invention illustrating the bonding of a pair of active device region clusters and the associated outriggers;

FIG. 2 is a more detailed illustration of one of the pair of active device clusters illustrating the active device region and a cap bonded to the wafer;

FIGS. 3A and 3B are top plan and side elevational views respectively of a capped row of active device region clusters illustrative of a number of bond pads affixed to a wafer having a device region sputtered onto the wafer substrate and an adhesive groove disposed in the cap;

FIG. 11 is top view of a bi-directional flat head according to the present invention in which the head may be pitched at an angle relative to the tape path to facilitate azimuth recording;

FIG. 12 is a top view of a bi-directional flat head according to the present invention including an asymmetric placement of the outriggers, in which an end portion of the outriggers is optionally slightly beveled to prevent tape damage;

FIG. 13 is a top view of the head of FIG. 12 and further including mounting, laser, optics, or other sensors requiring a relatively stable tape region;

FIG. 14 is a top of a bi-directional flat according to the present invention including an alternative asymmetric placement of the outriggers;

DESCRIPTION OF A PREFERRED EMBODIMENT

Figure 4A:
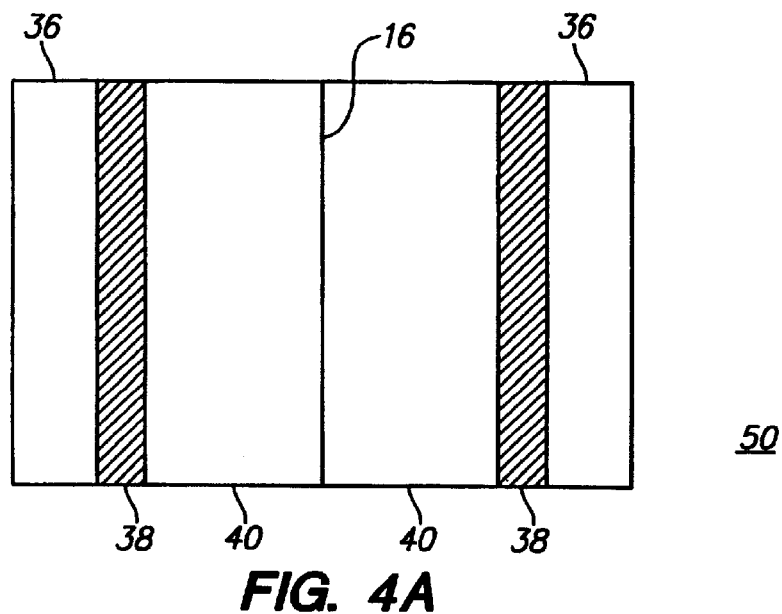
FIGS. 4A and 4B are top plan and side elevational views respectively of another embodiment of a pair of active device region clusters bonded together along a central bond line and including a ceramic base including a number of adhesive grooves disposed therein.

With reference now to FIG. 1, a top plan view of a representative embodiment of a variable width bi-directional flat head 10 in accordance with the present invention is shown. The head 10 comprises, in pertinent part, a pair of active device clusters 12 comprising clusters 14A and 14B. As illustrated, clusters 14A and 14B may be manufactured from a single wafer and then bonded back-to-back along bondline 16.

Each of the clusters 14A and 14B then incorporates a respective active device region 18A and 18B which may comprise a magnetoresistive ("MR") sensor. A pair of cantilevered outriggers 20A and 20B is bonded to the lateral sides of the respective clusters 14A and 14B in a generally parallel and spaced apart relationship to each other. The outriggers 20A and 20B may each serve as a leading and trailing edge outrigger depending on the motion of the tape and each extends from a respective medial point of attachment 24A and 24B to the cluster pair 12 to a respective distal point 26A and 26B.

With reference additionally now to FIG. 2, a more detailed illustration of one of the pair of active device clusters 14B is shown including the active device region 18B. In this view, it is seen that a cap 22 may be bonded to the lateral side of the clusters 14A and 14B prior to the bonding of the outriggers 20A and 20B respectively.

The bi-directional variable width flat head 10 can be seen to comprise a variable width surface where the "flat head effect" may be achieved in operation. This effect is a desired result and, in operation, is due to the suction created over the tape head as a consequence of the tape being "over-wrapped" at the leading edge. Definitionaly, "over-wrapped" tape is considered to be from approximately 0.1 to ~4.0 degrees of wrap with respect to the tape head surface. In any event, through the use of the design of the present invention, this effect is induced over a portion of the head 10 for contact recording over sets of active elements 18A and 18B. However, the effective width presented in the design disclosed varies in such a way as to minimize unnecessary contact of the head 10 with the tape during its operation.

In the particular embodiment of the present invention illustrated, two sets of active elements or "device clusters" 14A and 14B have been bonded together. A cap 22 is bonded over the active element region of each cluster 14A and 14B in order to protect the active elements 18A and 18B respectively from wear from the data tape during contact recording. These clusters 14A and 14B are flat lapped in "row bars" to achieve MR stripe height control. Two capped rows of clusters 14A and 14B may then be bonded together to provide a set of forward and reverse sets of active elements 18A and 18B. A simple fixture may be used for this assembly. The active elements 18A and 18B are aligned to be adjacent to each other by the use of a precise grinding cut and precise fixture. Once bonded and aligned, dual clusters 14A and 14B are cut out of the bonded row bars.

This double cluster pair 12 is itself relatively narrow in dimensions and cannot itself mechanically support the tape across the head 10 in operation. Therefore, bonded to the leading and trailing edges (or sides) are two outriggers 20A and 20B, which mechanically support the data tape during operation. In addition, the outriggers 20A and 20B provide wrap angle control to induce the "flat head effect" (suction of the tape down to the head 10) along both the leading one of the outriggers 20A and 20B, the entire double cluster pair 12 with both forward and reverse active elements 18A and 18B. The trailing one of the outriggers 20A and 20B provides mechanical support for the tape, however, it does not itself serve to induce the "flat head effect" because the tape is not "over-wrapped" over the leading edge of this particular outrigger 20A or 20B. This also serves to minimize wear on the tape.

With respect to the cap 22, this material may be applied to the wafer row or wafer cluster prior to flat lapping in order that the flap lapping process can remove any discontinuities between the cap 22 and the wafer surfaces. The cap 22 material should be selected to match the mechanical properties of the wafer substrate material as to coefficient of thermal expansion, hardness, fracture toughness, elastic modulus and the like and it serves to protect the wafer devices from wear during contact recording. In a particular embodiment of the present invention, the cap may comprise, for example, alumina titanium carbide (Al—TiC).

With reference additionally now to FIGS. 3A and 3B, top plan and side elevational views respectively of a capped row of active device region clusters 30 are shown illustrative of a number of bond pads 34 being affixed to a wafer 32 having a device region sputtered 38 onto the wafer substrate 40 and an adhesive groove 42 disposed in the cap 36. It should be noted that any number of clusters might be provided along a particular row. After the cap 36 has been bonded to the wafer row/cluster by filling the adhesive groove 42 with adhesive material, it may be flat lapped for purposes of maintaining the MR stripe height control. This then creates a uniform surface between the cap 36 and wafer 32 material. The adhesive groove 42 can be used to minimize the amount of adhesive exposed in the bondline between the wafer 32 and cap 36.

Figure 4B:
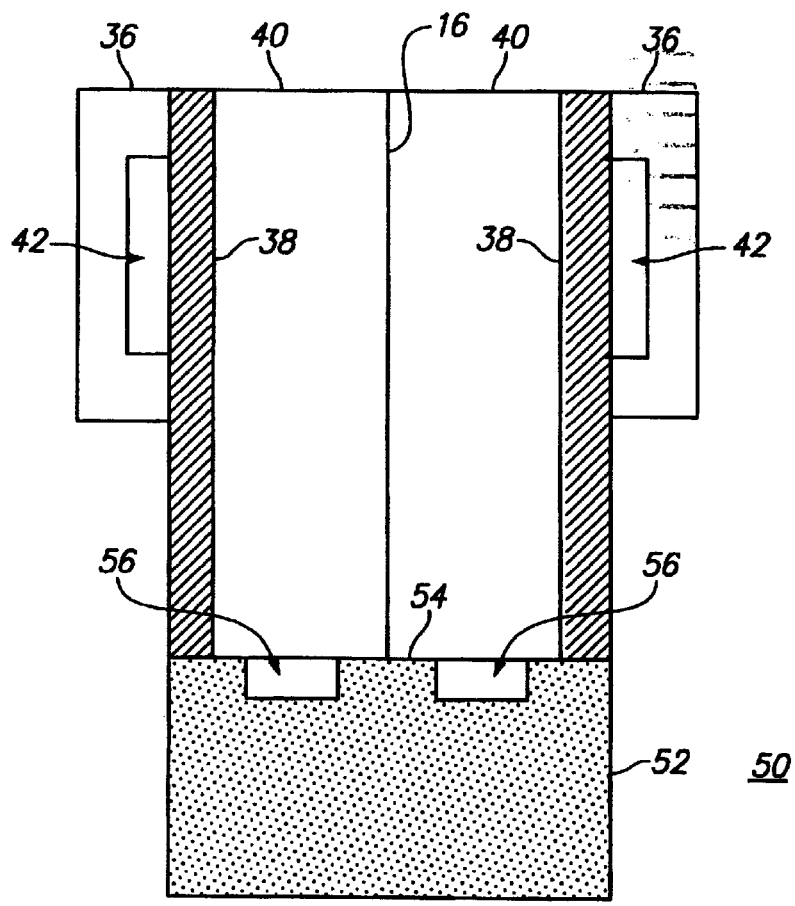

With reference additionally now to FIGS. 4A and 4B, top plan and side elevational views respectively of another embodiment of a pair of active device region clusters 50 are shown bonded together along a central bond line 16 and including a ceramic base 52, including a number of adhesive grooves 56 (filled with adhesive) disposed therein in an upper surface 54 thereof. With respect to the pair of active device region clusters depicted, like structure to that previously illustrated and described has been like numbered and the foregoing description thereof shall suffice herefor. With respect to the particular embodiment of the present invention illustrated, it should be noted that the length of the ceramic base 52 might be the same as the length of the cluster pair or rows of clusters that have been bonded together. The adhesive grooves 56 in the upper surface 54 of the base 52 may or may not be included, depending upon the particular application.

As previously described, the base 52 may be bonded at the upper surface 54 thereof to the capped clusters as shown. It provides additional strength for bonding the cluster pairs and rows of cluster pairs together. Preferably, the base may comprise polished ceramic material similar to the wafer substrate material or other material having corresponding mechanical properties such as its coefficient of thermal expansion, Young's Modulus and the like. As illustrated, adhesive grooves 56 may be added along the upper surface 54 to aid alignment of the clusters and provide grooves for retaining an adhesive.

In the embodiments previously described and illustrated, as well as those which will be described hereinafter, the adhesive for forming the cluster pairs, affixing the outriggers, bonding the base and the like may any suitable substance such as a reactive urethane acrylic adhesive with preferably low stress and room temperature cure properties. The adhesive may contain silver (Ag) or other electrically conductive particles for use in potentially grounding and/or shielding the two device clusters. In general, all component elements to be assembled should be cleaned prior to assembly and bonding.

In a particular embodiment, the adhesive for affixing the cap 36 may comprise an aromatic amine, which may be frozen, with a glass transition temperature Tg~130° Celsius and a viscosity of v~350 centipoise. In general, the adhesive used should be chemically resistant, as well as provide sufficient mechanical strength for multiple post-wafer processing steps. This particular adhesive requires an oven cure step.

The adhesive for affixing the outriggers 20A and 20B (FIGS. 1 and 2) may be selected depending upon whether the outrigger 20 is utilized itself as a cap (thereby eliminating a separate cap 22) or whether it is bonded to the capped cluster. The requirements for the adhesive depend upon how much processing stress (thermal, mechanical, chemical, etc.) the outrigger 20 bondline will be exposed to and on the deformation requirements of the bonded part (i.e. an oven cure adhesive process induces additional deformation as compared to low-shrinkage room temperature cure adhesive). In general, where the outrigger 20 is itself utilized as a cap, the selected adhesive may be the same as utilized to affix the cap 22 itself (using an oven cure). In those instances in which the outrigger 20 is bonded to a cap 22, the selected adhesive may be the same as utilized in forming the cluster pair (using a room temperature cure).

Figure 5A:
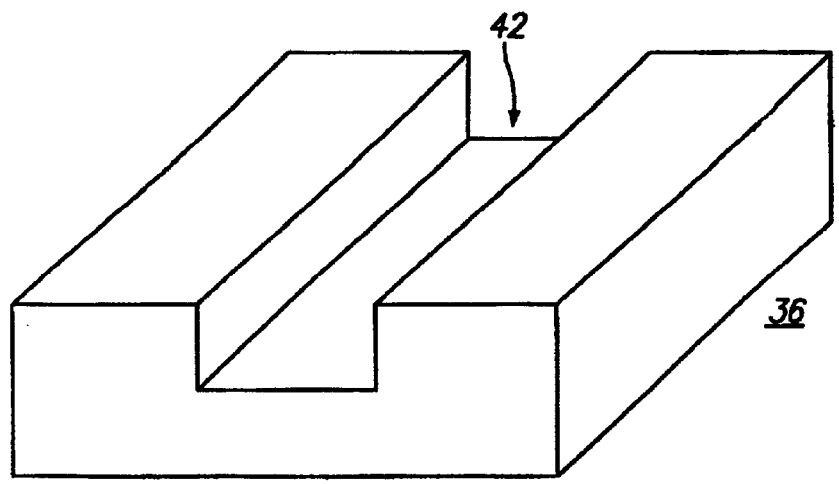
FIGS. 5A and 5B are differing isometric views of embodiments of caps for possible use with varying embodiments of the present invention illustrating a single, centrally located longitudinal adhesive groove and a pair of generally parallel and spaced apart longitudinal adhesive grooves respectively.
Figure 5B:
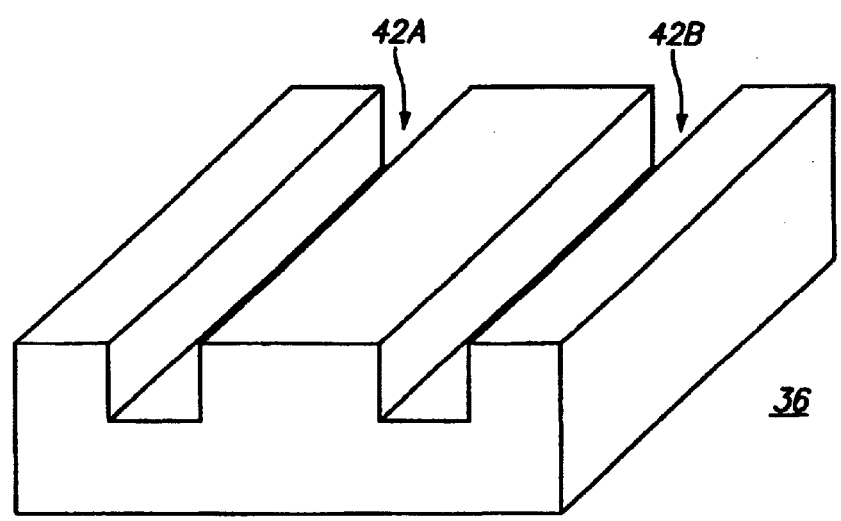

With reference additionally now to FIGS. 5A and 5B, differing isometric views of embodiments of caps 36 for possible use with varying embodiments of the present invention are shown illustrating a single, centrally located longitudinal adhesive groove 42 in the first instance and a pair of generally parallel and spaced apart longitudinal adhesive grooves 42A and 42B in the second respectively.

Figure 6A:
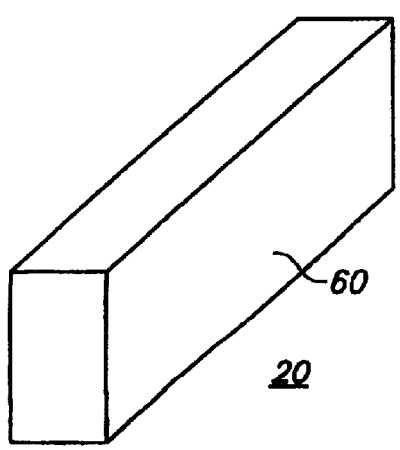
FIGS. 6A and 6B are differing isometric views of embodiments of outriggers as previously illustrated for use in conjunction with the present invention showing an adhesive bonding surface and longitudinally extending adhesive groove for affixing the outriggers to an associated active device region cluster.
Figure 6B:
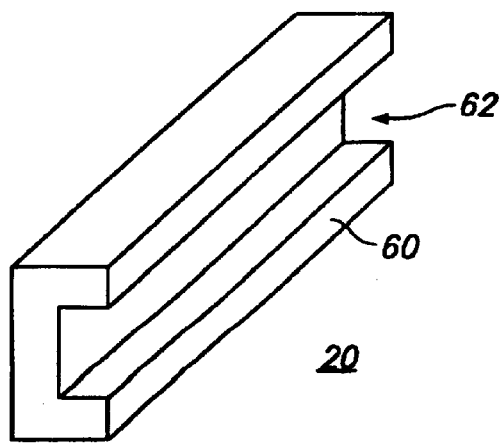

With reference additionally now to FIGS. 6A and 6B, differing isometric views of embodiments of outrigger 20, as previously illustrated for use in conjunction with the present invention, are shown depicting an adhesive bonding surface 60 in the first instance and a longitudinally extending adhesive groove 62 formed in the adhesive bonding surface 60 in the second instance, for affixing the outriggers 20 to an associated active device region cluster.

The outrigger 20 material should be selected to be, for example, a wear resistant ceramic generally matching the mechanical and thermal properties of he cap 36 and wafer substrate materials such as Al—TiC. As noted previously, the outrigger 20 may be bonded to the individual wafer clusters directly to serve as both a cap and outrigger. In this instance, the outrigger 20 may include an adhesive groove 62 as shown. An outrigger 20 bonded to a single cluster may be flat lapped together. Two double clusters, each having a bonded outrigger 20 may be bonded together thereby requiring a fixture to accommodate the cluster-outrigger pair, unlike the double cluster pair previously described.

Figure 7A:
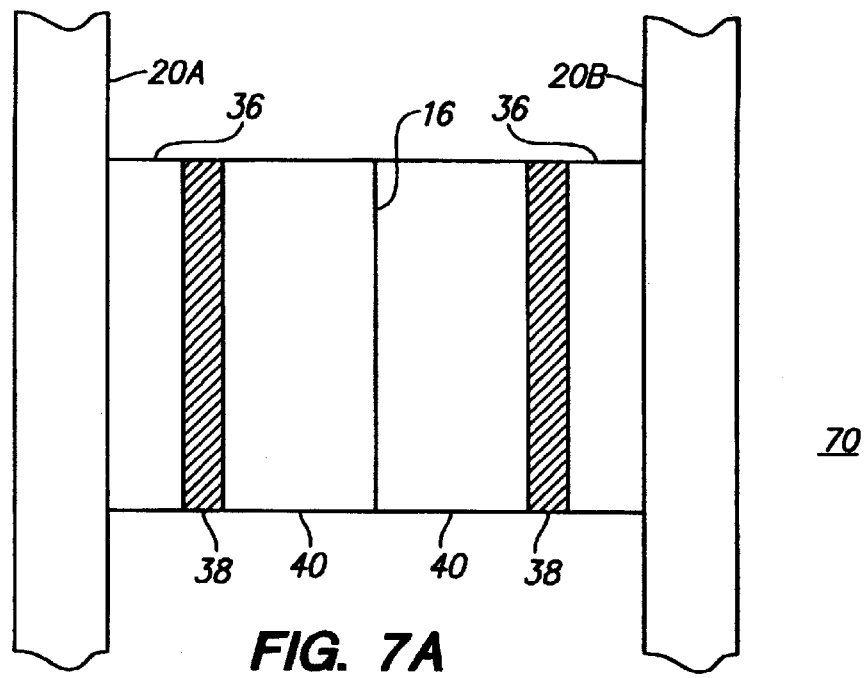
FIGS. 7A and 7B are top plan and side elevational views respectively of the pair of active device region clusters as previously illustrated in FIGS. 4A and 4B, including the bonding of a pair of outriggers as shown in FIG. 6B thereto.
Figure 7B:
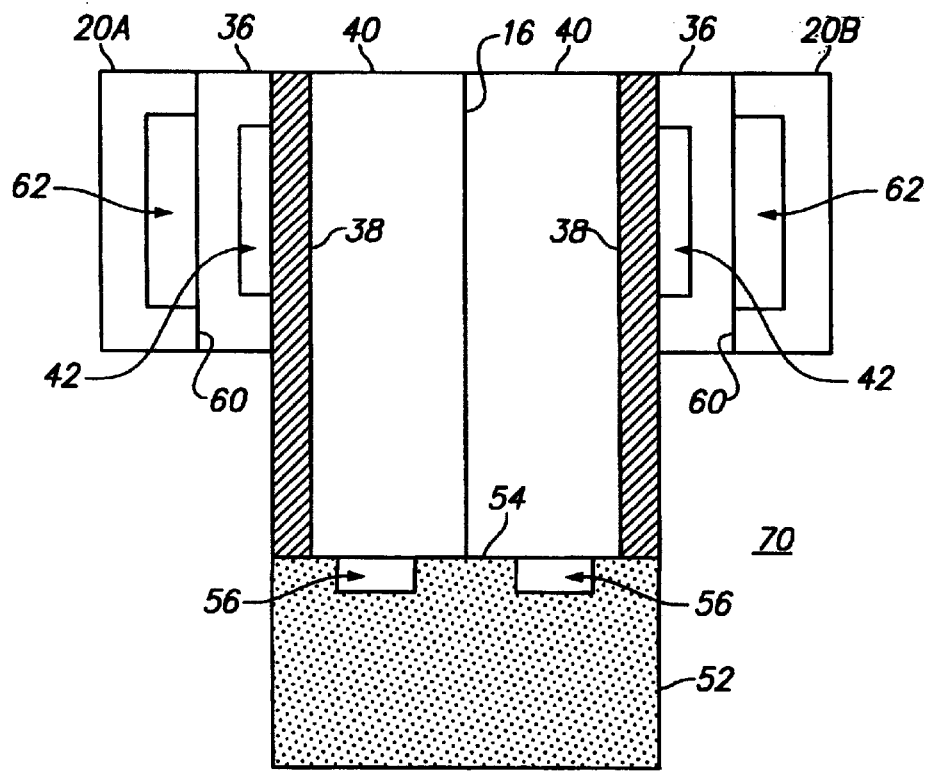

With reference additionally now to FIGS. 7A and 7B, top plan and side elevational views respectively of a pair of active device region clusters 70 as previously illustrated in FIGS. 4A and 4B are shown including the bonding of a pair of outriggers 20 as shown in FIG. 6B. With respect to these figures, like structure to that previously illustrated and described has been like numbered and the foregoing description thereof shall suffice herefor.

Figure 8:
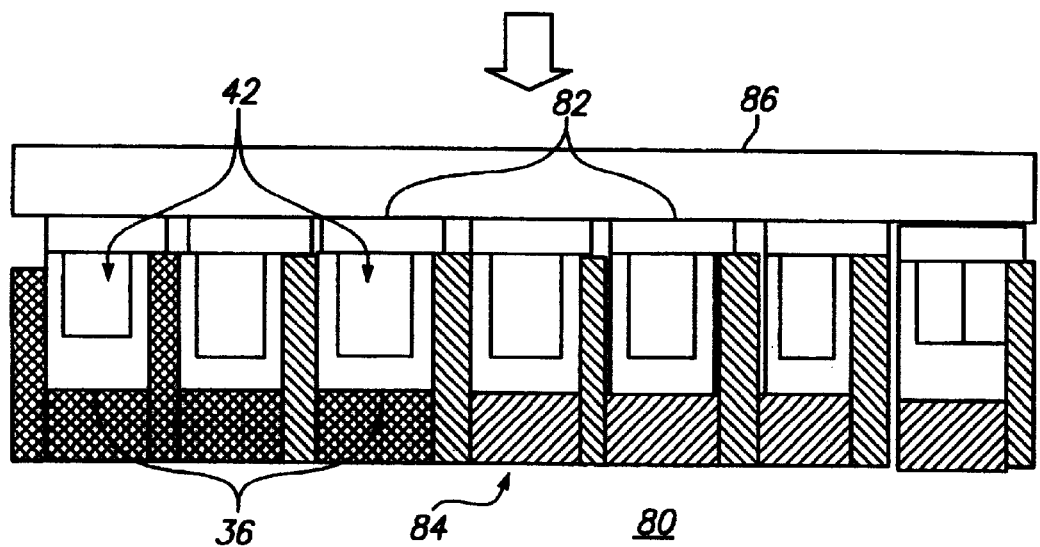
FIG. 8 is a simplified side elevational view of a portion of a process for bonding a plurality of caps to a number of wafer clusters, wafer sections or whole wafers and illustrating the bonding fixture base and top for effectuating the same.

With reference additionally now to FIG. 8, a simplified side elevational view of a portion of a process 80 for bonding a plurality of caps 36 to a number of wafer clusters 82, wafer sections or whole wafers is shown also illustrating the bonding fixture base 84 and top 86 for effectuating the bonding process. The fixture base 84 holds the caps 36 in correct alignment for bonding while a force in the direction of the arrow is applied to the top 86 during the cure process.

Figure 9:
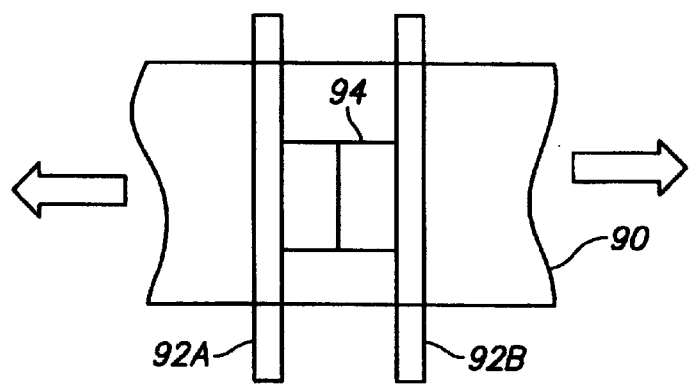
FIG. 9 is a top view of a bi-directional flat head according to the present invention in which the head outriggers are wider than the tape and mechanically support the tape across the full width thereof.

Referring now to FIG. 9, a data transducer for accessing data on a tape medium 90 of a predetermined width includes at least one generally rectilinear cluster 94 having opposing ends and orthogonal lateral sides, and an active device region formed in the cluster. A pair of parallel and spaced-apart cantilevered outriggers 92A and 92B are affixed to the lateral sides of the cluster and extend outwardly from the opposing ends. The end portion of the outriggers 92A and 92B can be beveled or slightly edge-blended to prevent tape damage, for example, in the case where the head moves in a transverse direction to the tape transport direction. In FIG. 9, the pair of outriggers 92A and 92B are of sufficient length to extend beyond the width of the tape medium 90 and mechanically support the full width of the tape.

Figure 10:
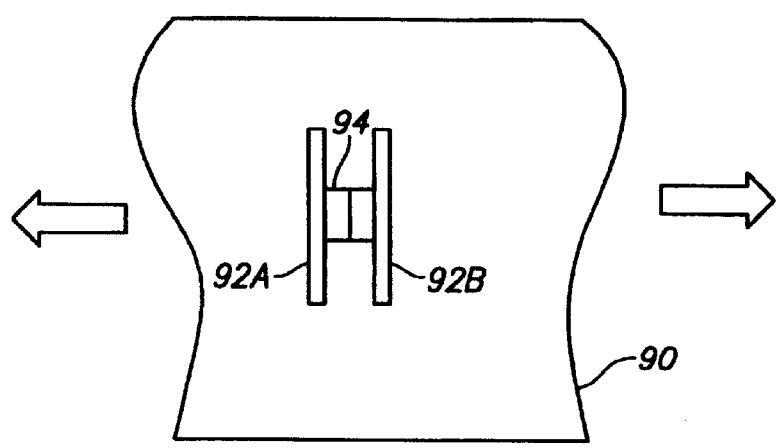
FIG. 10 is a top view of a bi-directional flat head according to the present invention in which the tape is wider than the head outriggers, in which the ends of the outriggers may be beveled or slightly edge-blended to prevent tape damage.

Referring now to FIG. 10, the data transducer cluster 94 and outriggers 92A and 92B are sized so that the width of the tape medium 90 extends beyond the length of the pair of outriggers 92A and 92B.

Referring now to FIG. 11, the entire data transducer cluster 94 and outriggers 92A and 92B are pitched at an angle relative to the tape medium 90 to allow azimuth recording. The outriggers 92A and 92B can be sized as shown in either of previous FIGS. 9 or 10.

Referring now to FIG. 12, a data transducer cluster 94 is shown in which the pair of outriggers 92A and 92B are asymmetrically affixed to the lateral sides of the cluster 94 to form a first, longer portion designated "A" and a second, shorter portion designated "B". Circular areas 96 generally show, as previously described, an end portion of outriggers 92A and 92B that may be slightly beveled for prevention of tape damage.

In FIG. 13, the data transducer further includes a sensor 98 mounted within the first portion of the pair of outriggers 92A and 92B. In region "A" the outriggers 92A and 92B can support sensors for positioning of optics, lasers, and the like, and can be adjusted anywhere within the "A" region as shown.

Figure 15:
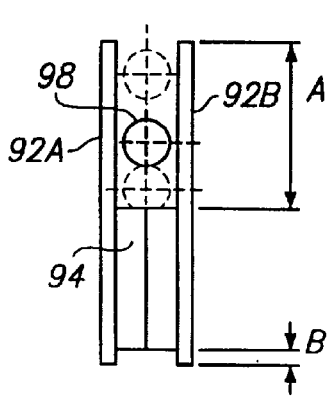
FIG. 15 is a top view of the head of FIG. 14 and further including mounting, laser, optics, or other sensors.

In FIGS. 14 and 15, an additional asymmetric placement of the outriggers 92A and 92B is shown corresponding to the descriptions above with reference to FIGS. 12 and 13, respectively.

Figure 16:
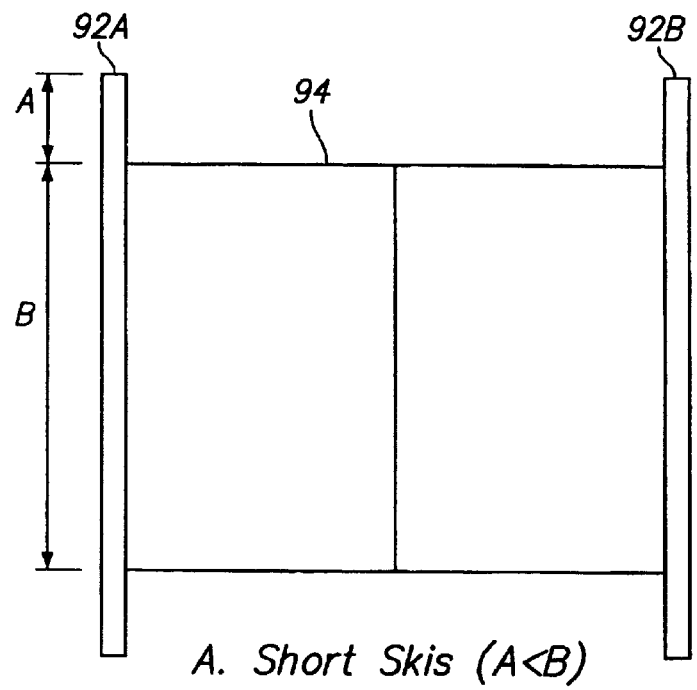
FIG. 16 is a top view of a bi-directional head according to the present invention in which the length of the outriggers is relatively short compared to the length of the head region.
Figure 17:
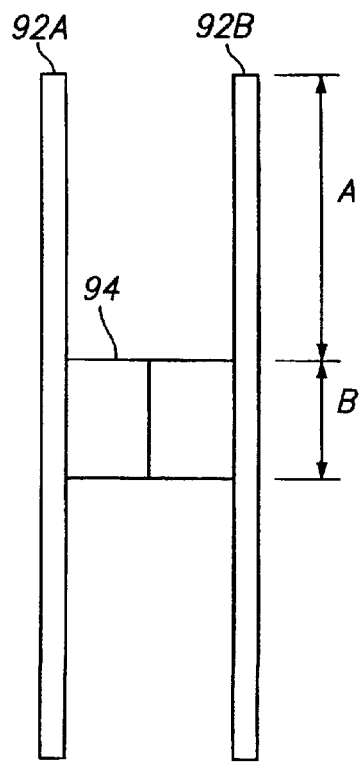
FIG. 17 is a top view of a bi-directional head according to the present invention in which the length of the outriggers is relatively long compared to the length of the head region.

In FIG. 16 a top view of the transducer 94 is shown in which the relative length of the outriggers 92A and 92B is short with respect to the length of the head region (A<B). In FIG. 17 a top view of the transducer 94 is shown in which the relative length of the outriggers 92A and 92B is long with respect to the length of the head region (A>B).

Figure 18:
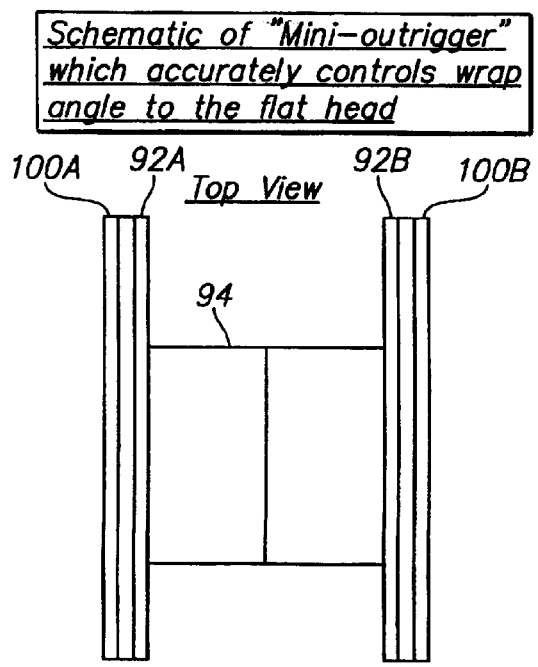
FIG. 18 is a top view of a bi-directional head according to the present invention in which the outriggers further include an additional set of recessed outriggers used to accurately control the wrap angle to the flat head region.
Figure 19:
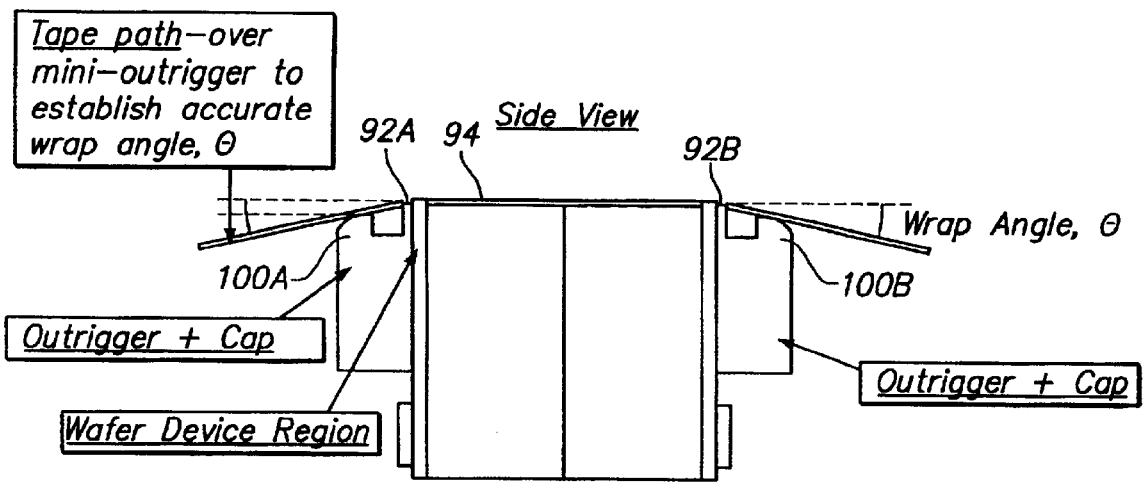
FIG. 19 is a side view of the bi-directional head of FIG. 18.

Referring now to FIG. 18, a plan view of a data transducer cluster 94 includes a second pair of generally parallel and cantilevered outriggers affixed to the first pair of outriggers to form combination outriggers 100A and 100B as shown. In FIG. 19, the side view shows that the second pair of outriggers is set back from the first pair of outriggers in order to establish a predetermined accurate tape medium wrap angle, θ.

Figure 20:
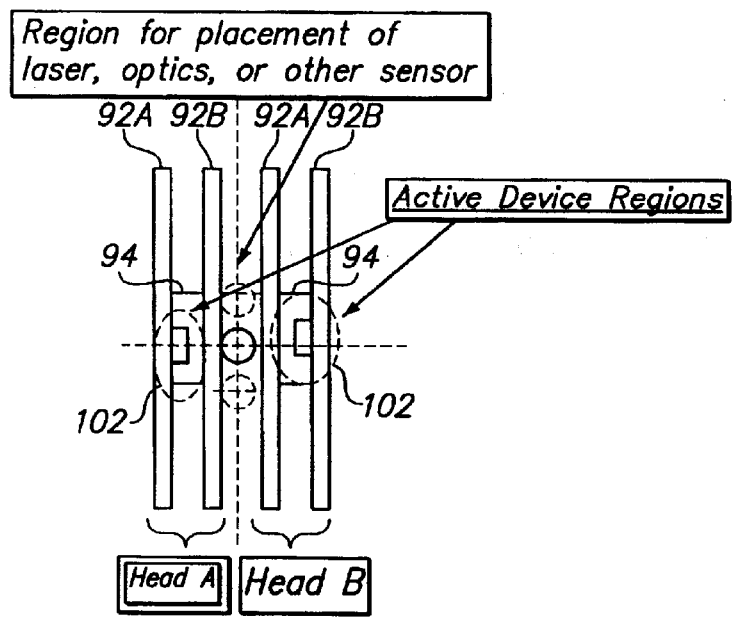
FIG. 20 is a top view of two bi-directional flat heads assembled and merged according to the present invention in which the two heads are mounted at a shallow angle with respect to each other such that the tape path wraps over each outrigger.
Figure 21:
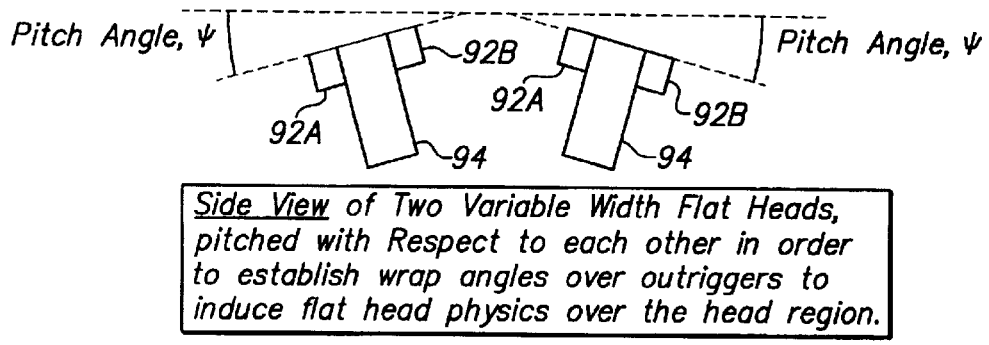
FIG. 21 is a side view of the two bi-directional flat heads shown in FIG. 20.

An example of two variable-width flat heads assembled and merged separately is shown in FIG. 20. The data transducer assembly includes first and second clusters 94 bonded together proximately at one of the lateral sides and pitched with respective to each other in order to establish a predetermined tape medium wrap pitch angle, ψ. In FIG. 20, two pairs of outriggers 92A and 92B, flat heads 94, and asymmetric active regions 102 are shown. In the side view of FIG. 21, the wrap pitch angle, ψ, is more clearly shown. The two variable width flat heads 94 are pitched with respect to each other in order to establish wrap angles over the outriggers 92A and 92B to induce desirable flat head physics of the head regions.

Figure 22:
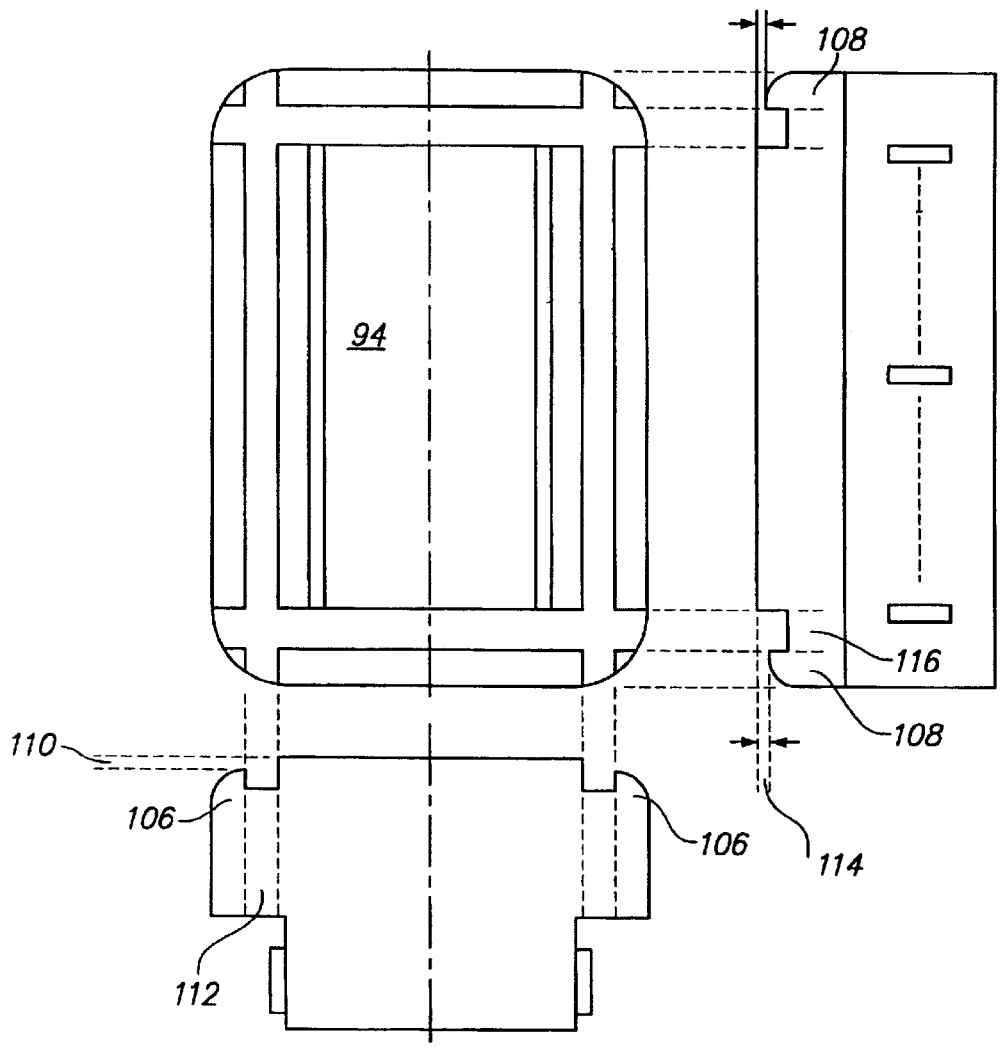
FIG. 22 is a top view and corresponding side views of a double-cluster flat head having recessed outriggers on all four sides for accurately controlling tape wrap on all sides of the head.

An example of a double-cluster flat head 94 with "mini-outriggers" 106 and 108 for accurately controlling tape wrap on all side of the head 94 is shown in FIG. 22. The data transducer includes at least one generally rectilinear cluster 94 having opposing ends and lateral sides, an active device region formed within the cluster, a first pair of generally parallel and spaced apart cantilevered outriggers 106 affixed to the lateral sides, and a second pair of generally parallel and spaced apart cantilevered outriggers 108 affixed to said opposing ends. Outrigger 108 is recessed a predetermined distance 114 from the surface of flat head 94 and spaced apart from flat head 94 by gap 116. Outrigger 106 is recessed a predetermined distance 110 from the surface of flat head 94 and spaced apart from flat head 94 by gap 112.

As previously noted, all parts and components, including the alignment fixture, should be cleaned and the surfaces specially prepared for the process 80. The parts to be assembled in the fixture are treated with an activator and adhesive (which may include an ultra-violet "UV" activator to enhance bonding) and a weight, or force, is applied until the adhesive cures. In general, the bonding fixture may be also made out of a ceramic material (in order to generally match the thermal properties of the cap and wafer material) which can be machined for precision surfaces. The fixture can be made for capping rows and clusters over portions of a wafer or the entire wafer itself. Since the bonding fixture will be thermally cycled, it must be designed to withstand this operation.

While there have been described above the principles of the present invention in conjunction with a specific head structure and outrigger configuration, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly, or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

I claim:

1. A data transducer for accessing data on a tape medium of a predetermined width, said transducer comprising:

at least one generally rectilinear cluster presenting opposing ends and lateral sides thereof;

an active device region formed within said at least one cluster; and a first pair of generally parallel and spaced apart cantilevered outriggers affixed to said lateral sides of said cluster extending outwardly from said opposing ends thereof.

2. A data transducer as in claim 1 in which at least one end portion of one of said outriggers is beveled.

3. A data transducer as in claim 1 in which at least one of said first pair of outriggers are of sufficient length to extend beyond the width of said tape medium.

4. A data transducer as in claim 1 in which the width of said tape medium extends beyond the length of said first pair of outriggers.

5. A data transducer as in claim 1 in which the entire data transducer is pitched at an angle relative to said tape medium to allow azimuth recording.

6. A data transducer as in claim 1 in which said first pair of outriggers is asymmetrically affixed to said lateral sides of said cluster to form a first, longer portion and a second, shorter portion.

7. A data transducer as in claim 6 further comprising a sensor mounted within said first portion of said pair of outriggers.

8. A data transducer as in claim 1 further comprising a second pair of generally parallel and cantilevered outriggers affixed to said first pair of outriggers.

9. A data transducer as in claim 8 in which said second pair of outriggers is set back from said first pair of outriggers in order to establish a predetermined tape medium wrap angle.

10. The data transducer of claim 1 wherein said at least one cluster comprises:

first and second clusters bonded together at one of said lateral sides thereof and pitched with respective to each other in order to establish a predetermined tape medium wrap angle.

11. A data transducer for accessing data on a tape medium of a predetermined width, said transducer comprising:
- at least one generally rectilinear cluster presenting opposing ends and lateral sides thereof;
- an active device region formed within said at least one cluster; and
- a first pair of generally parallel and spaced apart cantilevered outriggers affixed to said lateral sides; and
- a second pair of generally parallel and spaced apart cantilevered outriggers affixed to said opposing ends.

* * * * *